Dec. 1, 1970   C. W. MICHATEK   3,544,249
PERCUSSION TYPE FLASH LAMP IGNITER
Filed Oct. 14, 1968

CHESTER W. MICHATEK
INVENTOR.

BY John W. Huscer
Robert W. Hampton

ATTORNEYS

United States Patent Office 3,544,249
Patented Dec. 1, 1970

3,544,249
PERCUSSION TYPE FLASH LAMP IGNITER
Chester W. Michatek, Rochester, N.Y., assignor to Eastman Kodak Company, Rochester, N.Y., a corporation of New Jersey
Filed Oct. 14, 1968, Ser. No. 767,141
Int. Cl. F21k 5/02
U.S. Cl. 431—93                          4 Claims

ABSTRACT OF THE DISCLOSURE

A firing mechanism for a photographic apparatus having a striker element located adjacent to the firing locus of a primer of a percussion-ignitable flash lamp. The striker element is movable to an energized position, and when released is automatically moved successively into percussion impact with the flash lamp primer located at the firing locus and then out of the firing locus to permit facile removal and replacement of flash lamps.

CROSS-REFERENCE TO RELATED APPLICATIONS

Reference is made to copending U.S. application Ser. No. 765,930, entitled "Multilamp Flash Unit," filed Oct. 8, 1968, in the name of David E. Beach; commonly assigned copending U.S. application Ser. No. 766,739, entitled "Apparatus for Actuating Firing of Percussion-Ignitable Flash Lamps and Operating Mechanism Therefor," filed Oct. 11, 1968, in the name of William T. Hochreiter; and commonly assigned copending U.S. application Ser. No. 767,143, entitled "Mechanisms for Moving a Striker Element Out of the Firing Locus of a Percussion-Ignitable Flash Lamp," filed Oct. 14, 1968, in the names of Harold L. Malone and Chester W. Michatek.

BACKGROUND OF THE INVENTION

The present invention relates generally to photographic apparatus, and more specifically to an improved firing mechanism for percussion-ignitable photoflash lamps.

Before the development of electrically ignitable flash lamps, it was common practice to provide illumination for photographic purposes by igniting a small toner charge. Devices having means for striking the primer or percussion cap were utilized to ignite such flash-powder charges, one such device being disclosed in U.S. Pat. No. 942,941.

Recently, a photoflash lamp has been developed which utilizes a percussion-ignitable primer charge to ignite combustibles enclosed in a light-transmitting envelope. A plurality of these lamps have been assembled in a multilamp package in which each lamp has its own reflector and a firing tube or primer that extends to a common bottom wall of the unit. Such percussion-firable multilamp photoflash units and suitable bases and sockets for supporting the units for ignition in indexing rotation in photographic apparatus are disclosed in copending U.S. application Ser. No. 765,930.

When considering the prior art, it is apparent that old techniques for firing powder charges are unsuitable for use with the compact and automatic present-day photographic apparatus because, among other things, such prior art devices do not provide for fast removal and insertion of lamps.

When a flash lamp of the above-mentioned type is used with a photographic apparatus, the flash unit is inserted in a camera socket with the ignition primer located at a firing locus adjacent to a suitable percussion-firing mechanism. The striker element of the firing mechanism is moved to an energized position, normally in response to movement of the film-advancing lever, and when released urges the striker element into percussion impact with the flash lamp primer located at the firing locus for igniting the flash lamp.

A problem that is presented in a photographic apparatus of the type described is that in the rest or deenergized position, the striker element extends into the firing locus preventing insertion and removal of photoflash lamps. In such a mechanism, indexing of the flash unit for moving the primer of a new lamp into the firing locus may cause the primer to strike the striker element in its deenergized position resulting in premature firing of the new flash lamp. This problem is solved by the firing mechanism of the present invention.

SUMMARY OF THE INVENTION

This invention includes within its scope an improved firing mechanism for percussion-ignitable flash lamps having a striker element automatically movable into and out of striking engaegment with a primer of a flash lamp located at the firing locus, thereby permitting facile removal and replacement of flash lamps. The firing mechanism has a movement imparting means such as a cam engageable by and cooperable with the striker element as it moves from its energized to its deenergized position for moving the striker element from the firing locus following percussion impact with the primer.

It is therefore an object of the present invention to provide an improved firing mechanism for use with percussion-ignitable photoflash lamps for automatically withdrawing a striker element of the firing mechanism from the firing locus following percussion impact of the striker element with the primer of the flash lamp.

Another object of the present invention is to provide an improved firing mechanism for automatically moving a striker element into and out of striking engagement with a percussion-ignitable flash lamp, such firing mechanism being of simple design and construction, thoroughly reliable and efficient in operation, and economical to manufacture.

Objects and advantages other than those set forth above will be apparent from the following description when read in connection with the accompanying drawing.

DESCRIPTION OF THE PREFERRED EMBODIMENT

Figure 1:
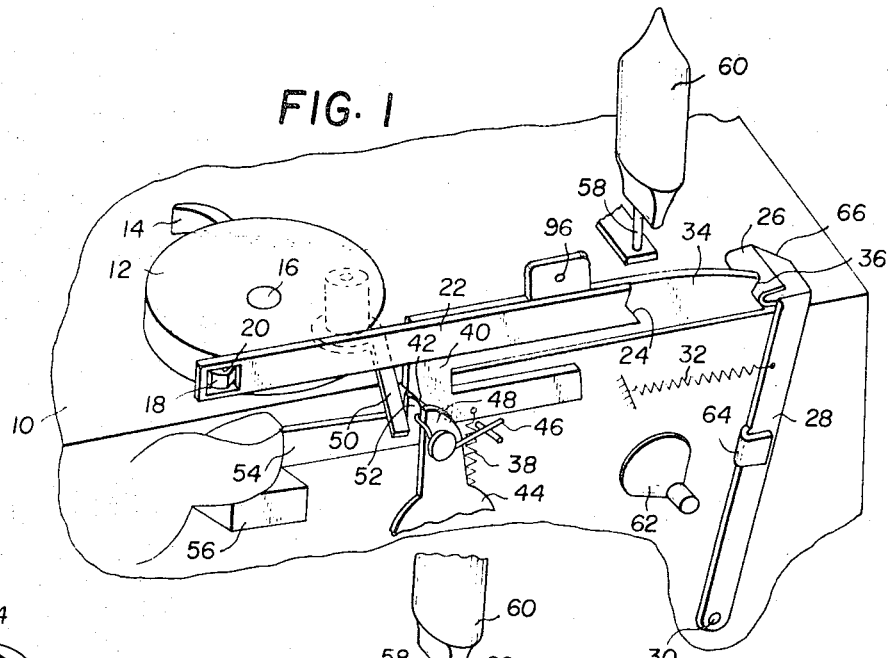
FIG. 1 is a schematic, perspective view of a portion of a photographic apparatus embodying the present invention and showing the firing mechanism in an energized position.
Figure 2:
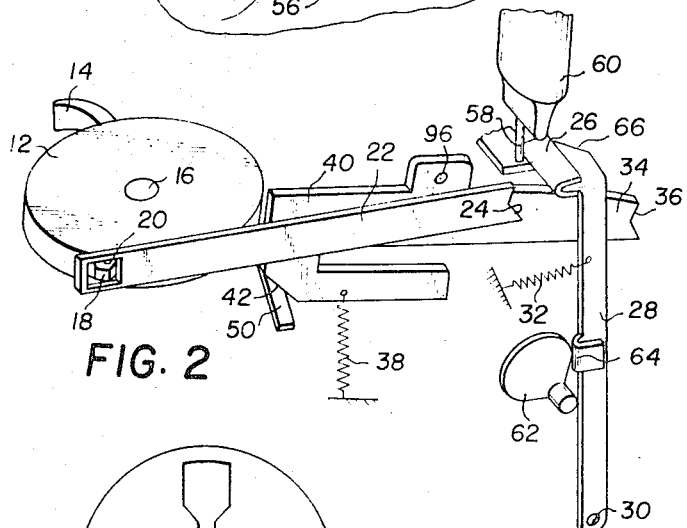
FIG. 2 is a view similar to FIG. 1 showing the firing mechanism in a striking position in which the striker element strikes the primer at the firing locus.

Referring to the drawing, this invention is shown in connection with a photographic appartus such as a camera 10. Since photographic cameras of the type hereinafter described are generally well known in the art, the present description will be directed in particular to elements forming a part of or cooperating more directly with the present invention, elements not specifically shown or described herein being understood to be selectable from those known in the art.

Referring to FIG. 1, a conventional film-winding lever 12 is shown having a handle 14 by which it may be manually rotatable back and forth about a shaft 16. A gear tooth 18 is provided on the periphery of winding lever 12 engageable with an aperture 20 at one end of a slidable cocking lever 22 guidable for reciprocal translatory movement by any suitable means, not shown. The lever 22 has a V-shaped notch 24 at one end in alignment with a V-shaped hammer 26 at one end of a plate-like, flexible striker element 28 pivotally mounted at 30. Upon rotation of winding lever 12 in a counterclockwise direction by the operator, notch 24 of lever 22 engages hammer end 26 of striker element 28 and pivots the striker element in a clockwise direction against the bias of a spring 32. During such movement, hammer 26, which rides on the upper edge of a latch member 34, enters a V-shaped notch 36 at one end of latch member 34 which releasably holds striker element 28 in an energized or cocked position as seen in FIG. 1. Release of winding lever 12 by the operator at the end of its travel in one direction causes the winding lever to be returned to its original position by any suitable spring means, not shown, as is well known in the art. The operator may then continue to move winding lever 12 back and forth for advancing the film to an exposure position. During such action, cocking level 22 continues to be reciprocally translated without any effect on energized striker element 28.

The latch member 34 for striker element 28 is pivotally mounted at 96, and is pivotally urged by a spring 38 in a counterclockwise direction. The member 34 has a laterally extending flange 40 at one end thereof provided with an inclined ramp 42 for a purpose to be explained hereinafter.

The shutter mechanism for camera 10 comprises a pivotally mounted shutter blade 44, shown in part, biased by a spring 46 into a normal aperture-close position as seen in FIG. 1. The shutter blade 44 has a lug 48 at one end thereof engageable by a driving member 50 as it is driven past for driving shutter blade 44 to an aperature-open position to make an exposure, the shutter blade being immediately returned by its spring 46 to its aperture-closed position to complete the exposure. The driving member 50 is of known type, and is movable in a clockwise direction as seen in FIG. 1 by film winding lever 12 and other mechanism, not shown, against the bias of a spring, not shown, to a cocked position in which it rides over the beveled edge of a stop lug 52 on a shutter release lever 54 and drops in front of lug 52 as seen in FIG. 1.

Depression of release lever 54 by a release button 56 removes stop lug 52 from the path of driving member 50 which initially strikes inclined ramp 42 of latch member 34 moving it in a clockwise direction for releasing striker element 28. The driving member 50 then strikes lug 48 on shutter blade 44 driving the shutter blade to its aperture-open position to expose the film. The inclined ramp 42 and lug 48 are properly positioned for actuation in timed relation so that striker element 28 is released and hammer end 26 strikes a primer 58 of a flash lamp 60 to ignite the lamp in proper synchronism with movement of shutter blade 44 to its aperture-open position. The driving member 50 is normally returned to its cocked position by the film-winding mechanism in the aforementioned manner as is well known in the art.

Figure 3:
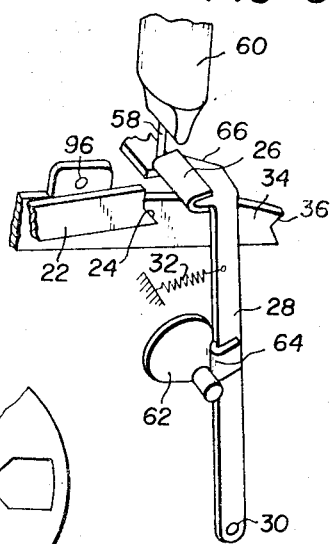
FIG. 3 is a segmental perspective view of the structure of FIG. 2 showing the striker element in its deenergized position in which the striker element is spaced from the firing locus.
Figure 4:
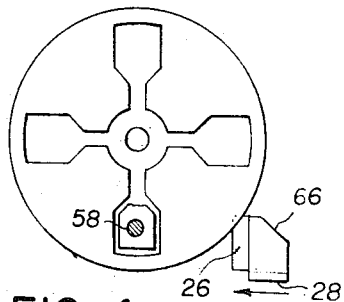
FIG. 4 is a segmental top plan view partially in section of the flash unit showing a flash lamp primer located at the firing locus and the striker element in its energized position.
Figure 7:
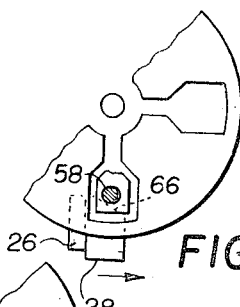
FIG. 7 is a view similar to FIG. 6 showing the relative positions of the fired primer and the striker element as the striker element is returned to its energized position.
Figure 5:
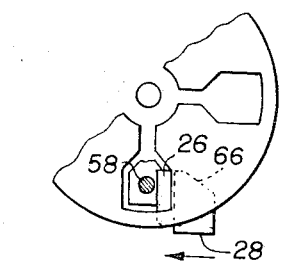
FIG. 5 is a segmental view similar to FIG. 4 showing the striker element striking the primer at its striking position.
Figure 6:
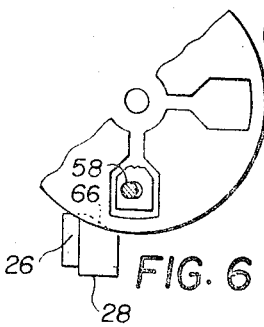
FIG. 6 is a view similar to FIG. 5 showing the positions of the primer and striker element when the striker element is in its deenergized position.

A movement imparting means is provided for automatically withdrawing hammer end 26 of striker element 28 from the firing locus, and comprises a cam 62 in the form of a frustum secured by any suitable means to camera 10. The striker element 28 has a cam follower surface 64 positioned to engage cam 62 substantially at the point of percussion impact of hammer end 26 with primer 58 of flash lamp 60. At impact, the momentum of striker element 28 causes cam follower 64 to engage cam 62 resulting in a flexing or twisting of striker element 28, and further causes some movement of primer 58 due to the resilience of the primer and flash lamp unit, such combined action withdrawing hammer end 26 from primer 58 with striker element 28 ending in a de-energized position as seen in FIGS. 3 and 6. This completes the exposure and camera 10 remains in this deenergized position until the operator operates film-winding lever 12 in the manner previously indicated for advancing film, energizing striker element 28, and cocking driving member 50. During such movement, a beveled edge 66 of hammer end 26 engages the fired primer 58 as cam follower 64 follows the surface of cam 62, and facilitates movement of hammer end 26 past the fired primer (see FIG. 7) as striker element 28 is being moved to its energized position.

The invention has been described in detail with particular reference to a preferred embodiment thereof, but it will be understood that variation and modification can be effected within the spirit and scope of the invention.

I claim:

1. In a camera of the type having means for detachably receiving a flash lamp unit having at least one lamp firable by striking an impact receiving element locatable at a firing locus, the combination comprising:
  energizable striker means defining a striking surface and having deenergized and energized positions on opposite sides of said firing locus;
  release means for releasing said striker means from its energized position for movement toward its deenergized position through said firing locus; and
  movement imparting means engageable by and cooperating with said striker means upon movement of said striker means from said energized position toward said de-energized position for releasing said striking surface from contact with an impact receiving element positioned at said firing locus.

2. The invention according to claim 1 wherein said movement imparting means comprises a cam, and said striker means comprises a cam follower movable on said cam.

3. The invention according to claim 1 wherein said movement imparting means comprises a frustum, and said striker means comprises a follower movable on said frustum.

4. The invention according to claim 1 wherein said impact receiving element is a percussion primer and said striker means comprises a flexible plate providing said striking surface urged in one direction into percussion contact with said primer, said plate further having a cam follower surface, and said movement imparting means comprises a cam engageable by said cam follower for flexing said plate in a direction transverse to said one direction withdrawing said striking surface from said primer to a position spaced from said firing locus.

References Cited

UNITED STATES PATENTS

| | | | |
|---|---|---|---|
| 744,540 | 11/1903 | Hamer | 95—11.5 |
| 794,189 | 7/1905 | Saunders | 431—92 |
| 942,941 | 12/1909 | Smith | 431—92 |
| 2,216,443 | 10/1940 | Malkin | 431—92 |

EDWARD J. MICHAEL, Primary Examiner

U.S. Cl. X.R.

95—11.5